United States Patent

[11] 3,615,648

| [72] | Inventor | Fernando Monckeberg Barros<br>Santiago, Chile |
|---|---|---|
| [21] | Appl. No. | 771,647 |
| [22] | Filed | Oct. 29, 1968 |
| [45] | Patented | Oct. 26, 1971 |
| [73] | Assignee | University of Chile as represented by Ruy Barbosa Popolizio, Rector<br>Santiago, Chile |

[54] PROCESS FOR THE EXTRACTION OF TOXIC SUBSTANCES FROM A PRESSCAKE OF BRASSICA NAPUS
1 Claim, No Drawings

[52] U.S. Cl. .................................................... 99/2 R,
                                                    99/17, 260/123.5
[51] Int. Cl. ...................................................... A23l 1/20,
                                                    A23k 1/00
[50] Field of Search ........................................... 260/123.5;
                                                    99/2, 20 E, 17

[56] References Cited
UNITED STATES PATENTS

| 2,615,905 | 10/1952 | Forstmann .................. | 99/2 |
| 2,987,399 | 6/1961 | Goering ....................... | 99/2 |
| 3,044,876 | 7/1962 | Goering ....................... | 99/2 |
| 3,099,649 | 7/1963 | Kawamura et al. ........... | 260/123.5 |
| 3,392,026 | 7/1968 | Mustakas et al. ............. | 99/17 |

*Primary Examiner*—Norman Yudkoff
*Assistant Examiner*—Curtis P. Ribando
*Attorney*—Curtis, Morris & Safford

ABSTRACT: A process for improving the biological value of proteins in Brassica Napus is shown. A presscake remaining after the plant is pressed and extracted to remove oils is subjected to the following steps. The presscake is first macerated in a quantity of water at room temperature for a period of 15 hours, the ratio of presscake to water being 1:5 by weight. The macerated presscake is then filtered from the water and agitated in a second quantity of water for a period of 3 hours. The extracted presscake is filtered from the second quantity of water and dried at a temperature not above 60° C. The dried presscake is then finely ground.

PROCESS FOR THE EXTRACTION OF TOXIC SUBSTANCES FROM A PRESSCAKE OF BRASSICA NAPUS

This invention relates to a process for improving the biological value of plants in the genus Brassica. More specifically it relates to an extraction process for removing toxic substances from a presscake remaining after Brassica Napus is pressed and solvent extracted to remove oils.

In recent years Brassica Napus and other closely related plant species sometimes referred to as "raps" have acquired some importance as a source of edible oils and have been raised for this purpose. The plants are first pressed and then solvent extracted to remove substantially all oils leaving a protein containing residue that has considerable biological value. The extraction process typically leaves a byproduct, presscake that contains about 40 percent protein having a net protein utilization of 74. Analysis of this protein for aminoacid content has indicated that it can be a substantial source of proteins for animal consumption and possibly for human consumption.

The proteins, however, are contaminated with certain toxic substances which render then unsuitable for animal or human consumption. These substances produce goiter, hepatic fibrosis and atrophy. "Raps" seeds contain thioglycosides which remain in the presscake during the oil extraction steps and hydrolyze in the presence of an enzyme known as mirosinase to liberate 5-vinyl thiooxazolidone and isothiocyanates.

It is the primary object of this invention to provide a process for improving the biological value of plants in the genus Brassica by extracting toxic substances from the residue remaining after oils have been removed.

It is a further object of this invention to provide a process for extracting the toxic substances from presscake formed by the pressing and extraction of oils from Brassica Napus and to render the extracted presscake suitable for animal consumption.

It has now been found that a presscake remaining after oils have been removed from plants in the genus Brassica can be substantially improved in biological value by the following process. The residue is first macerated in a quantity of water substantially in excess of the weight of the residue for a period of up to 15 hours at ambient temperature. The water and macerated residue are separated and the macerated residue is agitated in a second quantity of water for a period of up to 3 hours. The second quantity of water and extracted residue are separated and the residue is dried at a temperature not above 60°C.

In a preferred embodiment a presscake remaining after oil has been removed from Brassica Napus by pressing and solvent extraction is subjected to the following steps. The presscake is macerated in water at 20° C. for a period of 15 hours. The presscake and water are in a weight ratio of 1:5. The macerated presscake is filtered from the water and then subjected to continuous agitation in a second quantity of water under similar conditions for 3 hours. The second quantity of water and extracted presscake are separated by filtration. The presscake is dried at a temperature not in excess of 60° C. and then is finely ground.

The following example indicates the effectiveness of the foregoing process in removing toxic substances from "raps" presscake.

EXAMPLE I

A presscake remaining after Brassica Napus is subjected to pressing and solvent extraction to remove oil, is analyzed for toxic substances. It contains 8.25 milligrams per gram of 5-vinyl-thiooxazolidone and 5.95 milligrams per gram of isothiocyanates. The biological quality of this "raps" presscake, measured as net protein utilization, is only 40 percent. One hundred grams of this presscake are added to 500 grams of water and macerated therein at 20° C. for a period of 15 hours. The presscake is then filtered from the water, added to a second 500 grams of water and agitated therein at 20° C. for a period of 3 hours. The extracted presscake and water are separated by filtration. The presscake is dried at ambient temperature and finely ground. The thus processed presscake is analyzed for toxic substances. It contains 0.80 milligrams per gram and 0.28 milligrams per gram of 5-vinyl-thiooxazolidone and isothiocyanates respectively. The biological quality, measured as net protein utilization is 68 percent. It is thus comparable to milk, in which casein has a net protein utilization of 72 percent. Portions of original presscake, processed presscake and powdered milk, as a control, are fed to three groups of rats in order to determine the relative protein value of the original and processed presscakes. The rats are fed at a level of 20 percent protein calories (about 55 percent by weight). The results are given in table 1 below.

TABLE I

WEIGHTS (grams) OF RATS AT DIFFERENT AGES

| Time of Study (weeks) | Original Raps Presscake 16 animals | Treated Raps Presscake 60 animals | Powdered Milk (control) 30 animals |
|---|---|---|---|
| 0 | 34 ± 1.6 | 34 ± 1.8 | 39 ± 1.4 |
| 1 | 28 ± 4.5 | 52 ± 2.9 | 57 ± 2.1 |
| 2 | 30 ± 4.2 | 71 ± 4.1 | 77 ± 2.5 |
| 3 | 34 ± 3.2 | 89 ± 4.6 | 97 ± 2.9 |
| 4 | 38 ± 4.6 | 110 ± 5.5 | 118 ± 3.4 |
| 5 | 39 ± 5.6 | 126 ± 7.5 | 136 ± 4.0 |
| 6 | 42 ± 6.1 | 151 ± 7.4 | 154 ± 4.1 |

The weight gain of rats fed on processed presscake is but slightly less than that of rats fed on powdered milk and very substantially improved over that of rats fed on the original presscake. A histological study of the thyroid, liver, and kidneys of rats fed on processed presscake shows no damage or changes.

The process disclosed permits the utilization of valuable amounts of proteins in "raps" that at present have no safe use. Processed "raps" can be used as animal feeds, especially for poultry and pigs, and eventually perhaps for human consumption.

What is claimed is:

1. A process for improving the biological value of proteins in Brassica Napus by extracting toxic substances including 5-vinyl-thiooxazolidone and isothicyanates from a presscake remaining after said plant is first pressed and then solvent extracted to remove oil therefrom, comprising the steps of: macerating said presscake in a first quantity of water at about 20° C. for a period of 15 hours, the ratio of presscake to water being 1:5 by weight; filtering the macerated presscake from the first quantity of water; agitating the macerated presscake continuously in a second quantity of water for a period of 3 hours, the ratio of presscake to water being 1:5 by weight filtering the thus extracted presscake from the second quantity of water; drying said extracted presscake at a temperature of from 20° C. to 60° C.; and fine grinding the dried presscake.